Nov. 23, 1937. A. ROBERTSON 2,100,088
INSTRUMENT CORD
Filed July 6, 1936
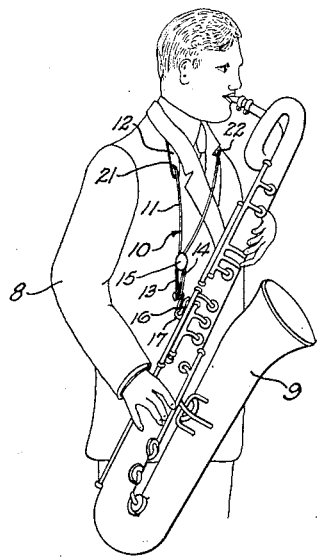
Fig. 1.
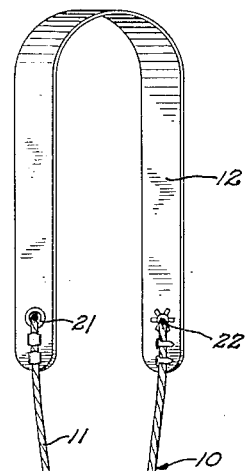
Fig. 2.
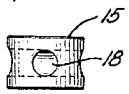
Fig. 5.
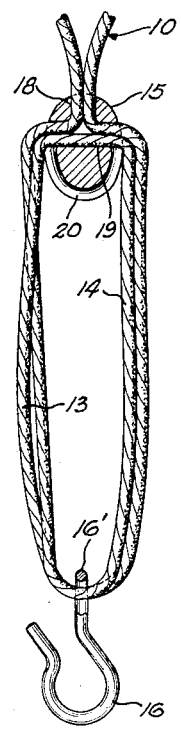
Fig. 3.
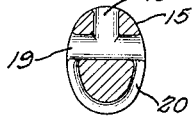
Fig. 4.
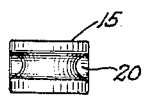
Fig. 6.
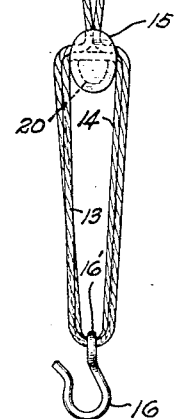
INVENTOR.
Albert Robertson,
BY Morsell, Lieber & Morsell
ATTORNEYS.

Patented Nov. 23, 1937

2,100,088

UNITED STATES PATENT OFFICE 2,100,088

INSTRUMENT CORD

Albert Robertson, Milwaukee, Wis.

Application July 6, 1936, Serial No. 89,093

1 Claim. (Cl. 224—5)

This invention relates to improvements in instrument cords, and more particularly to an adjustable supporting cord, depending from the neck of a musician, for supporting a wind instrument.

Wind instruments such as saxophones require the use of both of the player's hands for the manipulation of the valves, and it is therefore customary to aid in the support of the instrument by engaging it with a looped cord which encircles and depends from the neck of the player.

It is a general object of the present invention to provide a cord for this purpose which is readily adjustable, when in place and engaged, to vary the length of the cord for properly positioning the mouth piece of the instrument relative to the player's mouth.

A further object of the invention is to provide an instrument cord having a single loop portion and a double loop portion with a simple, effective and easily manipulated form of adjusting device at the junction of the loops to vary the relative relationship of the loops and thereby regulate the effective length of the entire cord.

A further object of the invention is to provide an instrument cord having an adjusting device through which various portions of the cord slidably pass and arranged so that tautness of the cord will cause binding and frictional engagements between engaged portions of the cord and adjusting device to prevent undesired slippage to affect the length of the cord after proper adjustments have been made.

A further object of the invention is to provide an instrument cord in which twisting and knotting tendencies of the cord are minimized so that the cord will always hang neatly and properly and is ready for manipulation.

A further object of the invention is to provide an instrument cord wherein there are no knots nor points of securement of the cord except at the two extremities of the cord which are fastened to opposite ends of a collar strap, all other portions of the cord being in sliding engagement with the adjusting device and the instrument hook.

A further object of the invention is to provide an instrument cord wherein the adjusting member is neat and compact with no protruding portions to catch clothing, and which can be formed in attractive designs and bear decorative indicia.

A further object of the invention is to provide an instrument cord which is of very simple construction, which is inexpensive to manufacture, which is strong and durable, and which is well adapted for the purposes set forth.

With the above and other objects in view the invention consists of the improved instrument cord and its parts and combinations as set forth in the claim, and all equivalents thereof.

In the accompanying drawing in which the same reference characters indicate the same parts in all of the views:

Fig. 1 is a view of a musician showing a saxophone supported by means of the improved adjustable cord;

Fig. 2 is an enlarged perspective view of the cord;

Fig. 3 is a fragmentary view, on a larger scale, showing the lower looped portions of the cord, and the adjusting member being shown in longitudinal section;

Fig. 4 is a detail, longitudinal sectional view of the adjusting member per se;

Fig. 5 is a top view thereof; and

Fig. 6 is a bottom view of the adjusting member.

Referring now more particularly to the drawing it will appear that a saxophone player or musician is indicated by the numeral 8 and he is represented as playing a saxophone 9 which is supported by the improved adjustable cord, indicated generally by the numeral 10.

The adjustable cord is arranged with an upper loop 11, adapted to encircle the neck of the player, and including a collar strap 12, and a pair of lower loops 13 and 14. Portions of the cord forming all of the loops extend slidably and adjustably through an adjusting member 15. Both of the lower loops slidably extend through the eye 16' of a hook 16, the hook being adapted to be engaged with a standard eye 17 projecting from an intermediate portion of the saxophone or instrument 9.

The adjusting member 15 is shown in detail in Figs. 3 to 6 inclusive and is in the form of a block, of any suitable material, having an oval shape. A bore 18 extends from the upper end of the block longitudinally inwardly to meet a transverse bore 19. The lower peripheral portion of the block, from one end of the bore 19 to the other end thereof, is formed with a groove or recess 20.

The loops 11, 13 and 14 are all formed from a single length of cord. One end of said cord is secured to an end of the collar strap 12, as at 21, and then the cord extends downwardly therefrom and passes through the bore 18 of the block and is brought out of the block through one end of the bore 19. The cord then extends downwardly through the eye 16' of the hook 16 and then is continued upwardly and passed entirely through the bore 19 again passing through the end thereof through which it was first passed. In this manner the lower loop is arranged. After leaving the bore 19 the cord is extended adjacent the loop 14 in half twisted relation and again passes through the hook eye 16' and is brought upwardly to extend through the other side of the bore 19 and out of the upper end of the block, via the bore 18. The second continuation of the cord below the block, just described, forms the other lower loop 13. After leaving the bore 18 through the upper end of the block, the cord is extended upwardly and its end is secured to the other end of the strap 12, as at 22. Obviously the portions of the cord above the block, including the strap 12, form the upper loop 11 and it should be noted that the cord is unbroken throughout and is not made fast at any point to any portion of the adjusting block 15 nor to the hook 16.

The effective length of the cord may be varied very easily and expeditiously. When the upper loop encircles the neck of the musician the cord depends as shown and by holding the hook 16 lightly with one hand the block 15 may be engaged with the other hand to be slid upwardly or downwardly, with the cord somewhat slack. An upward movement of the block serves to shorten the effective length of the cord and when this is accomplished the upper loop is made smaller and the lower loops enlarged, but the latter are enlarged to a considerably lesser extent than the former is lessened. In a reverse manner, when the block is lowered the effective length of the cord is increased. In making these adjustments there is relative sliding movement between the engaged parts of the block and cord and between the engaged portions of the cord and eye of the hook 16.

When the proper adjustment has been made and the cord is in use and is sustaining the weight of the instrument the friction of the cord through the bores of the block and its binding engagement with portions of the block is sufficient to prevent the adjusting block from shifting its position, and the cord will maintain its adjusted length. The hook 16 will of course find its proper position at the lower ends of the loops 13 and 14, regardless of the adjustment of the same.

The improved adjusting block 15 is flat and smooth and has plane surfaces. There are no projections thereon to catch clothing and the plane surfaced faces of the blocks may be utilized for suitable ornamentation. Due to the fact that the cord is not made fast to either the hook nor the block twisting tendencies are minimized and the cord will naturally hang in, and assume a proper position ready for adjustments.

From the foregoing description it will be seen that the improved instrument cord is of simple and novel construction, and it is well adapted for the purposes described.

What is claimed as the invention is:

A sliding adjuster for looped instrument supporting cords, consisting of a bored block having plane surfaced opposite faces, the block having a T-shaped bore therein formed by a medially located transverse bore and a longitudinal bore extending from one end of the block to and communicating with the transverse bore, the exterior of the block having a groove extending from one end of the longitudinal bore to the other end thereof and around the end of the block remote from the longitudinal bore, whereby the block may be bindingly adjusted on a cord which is susceptible of extension in doubled formation through the longitudinal bore with single strands passing in opposite directions through the transverse bore and into the groove and further looped and passed entirely through the transverse bore.

ALBERT ROBERTSON.